United States Patent Office 2,858,707
Patented Nov. 4, 1958

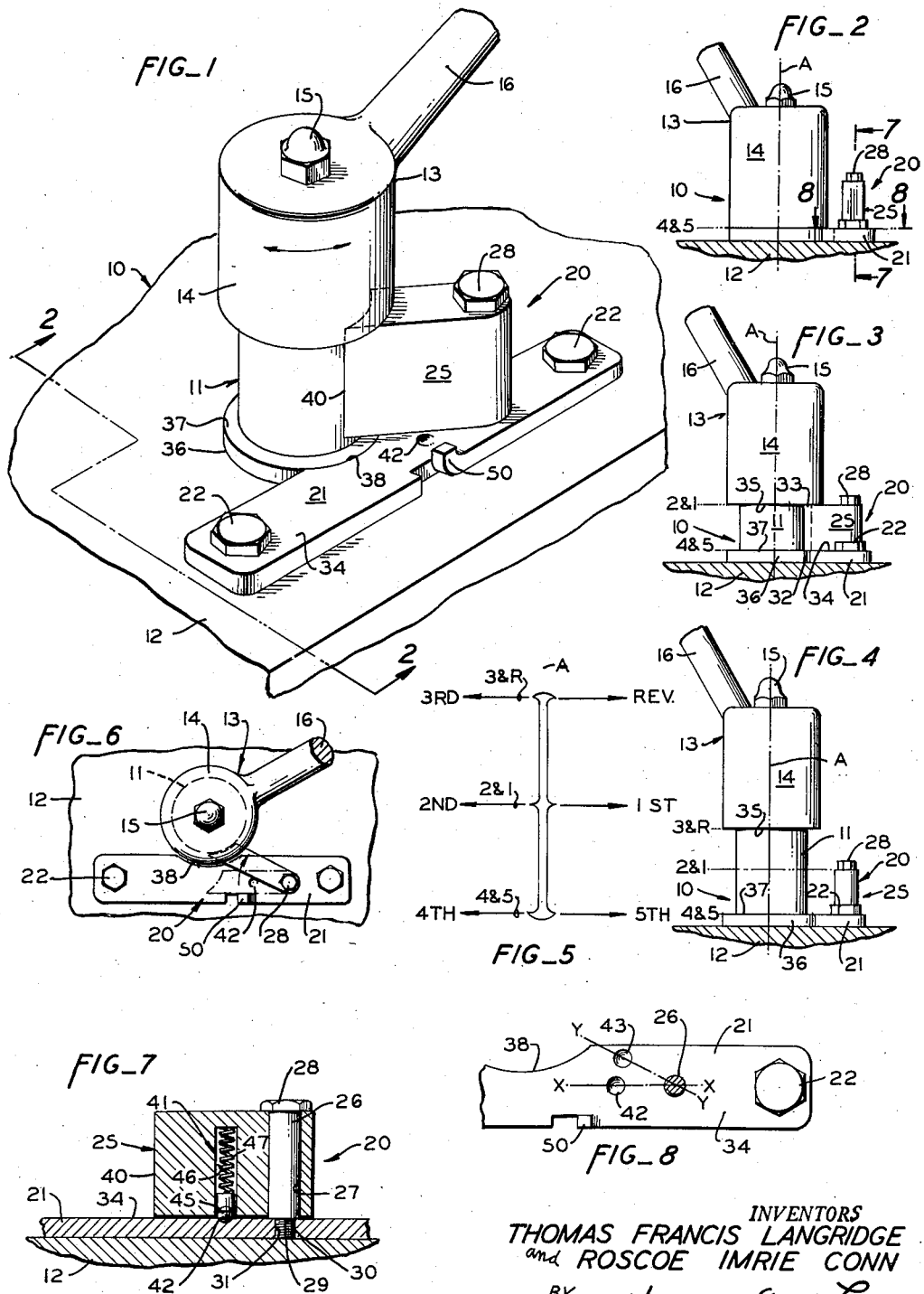

2,858,707

STOP FOR MULTI SPEED GEAR SHIFT

Thomas Francis Langridge, Santa Clara, and Roscoe Imrie Conn, Los Gatos, Calif.

Application November 20, 1956, Serial No. 623,375

5 Claims. (Cl. 74—473)

This invention relates to a block-out device or stop for multi speed gear shift mechanisms and more particularly to an improved construction in such block-out devices.

It is one object of this invention to provide a block-out device adapted for use with a conventional five speed gear shift lever and mechanism now being used in a well known tractor. The device of the present invention is especially adapted for use on a gear shift mechanism such as is shown and described in U. S. Patent No. 2,667,082, which issued on January 26, 1954 to one Brock. For this reason the present disclosure shows certain portions of the mechanism embodied in the Brock patent disclosure to better illustrate the utility and advantages of the present invention.

Another object of this invention is to provide a block-out device which is simple in construction, economical to manufacture and highly efficient in use.

It is a further object of this invention to provide a block-out device which is easily attached to a conventional five speed gear shift mechanism to facilitate operation thereof at various gear settings, with assurance and a minimum of effort on the part of the driver.

These and other objects of the present invention will become apparent from a reading of the following description in the light of the accompanying drawings in which:

Fig. 1 is a fragmentary perspective view of a gear shift mechanism and housing therefore with a block-out device embodying the present invention associated therewith.

Fig. 2 is an elevation view of Fig. 1 taken substantially along line 2—2 thereof and showing the gear shift lever and block-out device thereof at a slightly smaller scale.

Fig. 3 is a view similar to that of Fig. 2 with part of the block-out device in a different position.

Fig. 4 is a view similar to Figs. 1 and 2 with a part of the block-out device in still another position.

Fig. 5 is a shift motion diagram coordinated with the three different positions of the gear shift lever as seen in Figs. 2, 3 and 4.

Fig. 6 is a plan view of Fig. 1 at substantially the same scale as Figs. 2, 3 and 4.

Fig. 7 is a vertical section through a movable portion of the block-out device as seen from line 7—7 in Fig. 2 and at slightly larger scale with respect thereto.

Fig. 8 is a fragmentary plan view of a stationary portion of the block-out device of Fig. 2 as seen from line 8—8 therein and turned 90° relative thereto.

As previously stated, this invention is being shown in connection with a gearshift mechanism similar to the one shown and described in U. S. Patent No. 2,667,082. Since the exact construction of such gear-shift mechanism is merely incidental to the present invention, reference should be made to the aforementioned patent for further details thereof. For purposes of the present disclosure suffice it to say that the block-out device of this application is adapted for use with the gear shifting lever of multi-speed transmissions in which the lever must be moved up and down (vertically) preliminary to sidewise (horizontal) swinging into various gear operating positions.

Referring now to Figs. 1 through 5 the gear-shift mechanism 10 therein shown includes a sleeve shaft 11 which extends vertically from a transmission housing 12. This sleeve shaft 11 which is relatively stationary is like a standard supporting the gear-shift lever 13. The lever 13 includes a sleeve-like hub 14 which is guided for up and down movement on the standard 11 and is secured by a bolt 15 to an axial rod (not shown) which extends down through the standard 11 and into the transmission housing 12 for operative relation with gear changing mechanism therein as taught in the previously mentioned patent to Brock.

A gear-shift arm 16 extends diagonally upward from the hub 14 and is provided with a handle or knob (not shown) at its upper end which is accessible to the driver of the vehicle of which the transmission is a part.

Referring now to Figs. 2, 3 and 4, the transmission housing 12 is at all times assumed to be stationary as is the standard 11. The gear-shift lever 13, however, is movable both vertically and horizontally relative to the fixed housing 12. This mobility of the gear-shift lever is axially of the standard 11 in a vertical direction and pivotally relative to the standard 11 when the lever is moved in a horizontal direction. This movement, both vertically and horizontally is illustrated diagrammatically in Fig. 5 wherein A indicates the axis A of the standard 11 along which three distinct horizontal planes 3 and R; 2 and 1 and 4 and 5 indicate the position at which the gear-shift lever 13 must be disposed for horizontal or pivotal movement about the axis A in order to shift the gears in the transmission housing 12 to third and reverse speeds; second and first speeds, and fourth and fifth speeds, respectively.

The foregoing five speed and reverse gear-shift arrangement, so far as this application is concerned, is old and well known in the art as taught in U. S. Patent No. 2,667,082, already mentioned. Many users of this type of multi-speed gear-shift arrangement have expressed dissatisfaction with it, not because of its failure to operate in the manner intended but because of the difficulty encountered in attaining and/or maintaining one or the other of the vertical positions of the gear-shift lever during operation thereof. Moreover, since second and first speeds the two primary low speed and power attaining positions are intermediate the gear-shift lever 13, they must be manually held at such position by the driver because the hub 14 is not disposed for self support at such intermediate plane. This becomes more aggravating when the vehicle is loaded and/or is traveling in loose dirt, sand or mud requiring the driver to maintain the "stick" or lever 16 in 1st and 2nd gear-shift position. The same is true when the driver is desirous of traveling in reverse or 3rd speed position, although his greatest problem is encountered when he must drop the lever 13 back to low and second gear from 3rd and/or reverse gear position. This is so because the driver can easily gauge the extreme upper and lower planes in which the lever 13 can be moved from neutral to either speed at such extreme position. However, to find the intermediate position (2nd to 1st gear) is a problem especially when the vehicle is traveling over rough terrain.

The present invention relates to a block-out device generally designated 20 adapted to aid and assist the driver in attaining or maintaining the gear shift lever 13 in one or the other of its vertical planes of setting relative to the standard 11.

The block-out device 20 may be formed as a part of the transmission housing 12 but for all intents and purposes it is preferably constructed as an accessory adapted for ready attachment to the housing 12 as illustrated in the drawings. To this end the device 20 comprises a base plate 21 which is provided with a bore adjacent each its ends for passage of a bolt 22. The housing 12 must be bored and tapped in register with the bores in the base plate 21 to receive the threaded ends of the bolts 22 by which the plate 21 is firmly secured to the top surface of the housing 12.

A stop member 25 is pivotally connected to the base plate 21 by means of a shouldered bolt or pinion 26 as best seen in Fig. 7. The stop member 25 comprises a metal bar placed on edge and bored as at 27 adjacent one of its ends to receive the bolt 26. The bolt 26 from beneath its head 28 to its reduced undercut 29 is just slightly longer than the depth of the bore 27, i. e., the top to bottom dimension of the metal bar or stop member 25. The reduced threaded end 30 of the bolt 26 is threadedly connected to a tapped bore 31 in the plate 21 so that the stop member 25 is secured to the latter but free to pivot about the bolt 26 in a horizontal direction.

As seen in Fig. 3 the stop member 25 has its lower edge 32 disposed in plane 4 and 5 and its upper edge 33 disposed at the intermediate plane designated 2 and 1. Consequently it is important that the upper surface 34 of the base plate 21 be disposed in the plane 4 and 5 which is the extreme lowermost position of the bottom surface 35 of the hub 14 when the latter is turned to left or right for shifting the gears in the transmission housing to either fourth or fifth speed.

By the same token it is equally important that the upper surface or edge 33 of the stop bar or member 25 be disposed in the plane 2 and 1 where it can be engaged by the bottom surface 35 of the hub 14 for supporting the latter in proper position to achieve second and first speeds in gear changes when the lever 16 is swung to right or left.

At this point it should be noted that the standard 11 has an enlarged base 36, the upper surface 37 of which forms a stop for the hub 14 when the latter is dropped to its lowermost position. This surface 37 of the base 36 is therefore in the plane 4 and 5 which coincides with the upper surface 34 of the base plate 21. The base plate 21 therefore has a segmental recess 38 formed in one side edge thereof so as to fit snugly against the base 36 of the standard 11. While the exact position of the block-out device 20 relative to the standard 11 is not critical we prefer that the base plate 21 be placed in a fore to aft direction at the lefthand side of the standard 11 for purposes of convenience. This places the stop member adjacent the standard 11 and in a position to permit clear up and down passage or vertical movement of the hub 14 when the stop bar or member 25 is aligned with the base plate. However, when the stop member 25 is swung toward the standard 11 its free end 40 engages the standard 11 and its upper surface 33 is disposed to be engaged by the bottom surface 35 of the hub 14 when the latter is lowered. In other words the stop bar now serves to block downward movement of the hub 14 from its extreme uppermost position toward its lowermost position. Another way of saying this is that the stop bar serves to support the hub 14 in its intermediate position.

To complete the block-out device 20 we have provided means for releasably maintaining the stop bar 25 in either of its two extreme positions of horizontal movement, that is to say, in either its effective, hub blocking and supporting position; or its ineffective and non-blocking position. This means comprises a snap type latch or catch 41 consisting of a bolt and socket or recess.

There is a socket or recess for each of the two extreme positions to which the stop bar is to assume. Each recess is formed in the upper surface 34 of the base plate 21 as seen in Fig. 8 and they are radially disposed relative to the axis of pivotal movement of the stop member 25 about the bolt 26. The one recess 42 is disposed on a radial line X which is substantially parallel to the long axis of the base plate 21 whereas the other recess 43 is disposed on a radial line Y angularly disposed relative to the radial line X and parallel to the radial plane in which the stop member 25 must be disposed when in effective, hub blocking and/or hub supporting position.

The bolt portion of the catch 41 consists of a ball 45 disposed in a bore 46 formed in the stop member 25. This bore 46 is drilled from the bottom edge 32 of the stop member up into the main body of this metal bar sufficiently to receive a spring 47 which becomes compressed when the ball 45 is pressed up into the bore behind the spring 47.

The bore 46 is drilled into the metal bar at the same radial distance from the axis of the bolt 26 as are the two recesses 42 and 43 in the base plate. Both the ball 45 and compression spring 47 is pressed into the bore 46 when the stop member is swung far enough out from the base plate 21 to afford admittance of the ball and spring into the bore. The stop member is then swung back over the base plate whereupon the spring 47 will press the ball 45 into the recess 43. By pushing the stop member forcibly toward parallelism with the base plate 21 the ball 45 becomes unseated from recess 43 and will become seated in the recess 42 as illustrated in Fig. 7.

A stop tab 50 as shown in the drawings may be provided on the fixed base plate 21 to limit swinging movement of the stop member 25 out of alignment with the base plate or to a position where the ball 45 can be pushed out of the bore 46 by the spring 47. This cannot occur when the stop member is swung in the opposite direction, i. e., toward the standard 11 because the latter serves as a limiting means on that side of the block-out device. In this connection note that the extreme or free end 40 of the stop member 25 is contoured to lie flatly against the standard 11 when engaging the same. In the present disclosure since the standard 11 is round in shape, the free end 40 of the stop member is an arcuate recess conforming to the curve on the wall of the standard and in relation to the location of the pivot bolt 26 relative thereto. Thus it will be seen in Figs. 1 and 6 that the arcuate recess in the end wall 40 of the stop member is on the bias so as to lie flush with the round wall of the standard 11.

While we have described our new block-out device in specific detail it will be appreciated by those skilled in the art that it may be varied, modified, and/or altered without departing from the spirit of our invention. We therefore desire to avail ourselves of all variations, modifications and/or alterations as fairly come within the purview of the appended claims.

What we claim as new and desire to protect by Letters Patent is:

1. For a multi position gear shift mechanism having a gear shift lever, the hub of which is slidable on a shaft and turnable about the axis thereof at three different positions therealong, a blockout device comprising a stop member pivotally mounted adjacent said shaft for swinging movement toward and from the same and including a surface engageable by said hub portion when the latter is moved from one of its extreme positions toward an intermediate position along said shaft.

2. In gear shifting mechanism in which a gear shift lever is slidable along a shaft between two extreme positions therealong and turnable about the axis of said shaft at an intermediate position as well as at said two extreme positions along said shaft, a blockout device comprising a stop member pivotally mounted adjacent said shaft for movement toward and from the same, said stop member having a surface disposed to provide a rest for said gear shift lever at said intermediate position when said stop member is moved toward said shaft for limiting axial movement of said gear shift lever between only one of said extreme positions and said intermediate position.

3. In gear shifting mechanism in which a gear shift lever is slidable along a shaft between two extreme positions therealong and turnable about the axis of said shaft at an intermediate position as well as at said two extreme positions along said shaft, a blockout device comprising a stop member pivotally mounted adjacent said shaft for movement toward and from the same, said stop member having a surface disposed to provide a rest for said gear shift lever at said intermediate position when said stop member is moved toward said shaft for limiting axial movement of said gear shift lever between only one of said extreme positions and said intermediate position, and means carried by said stop member for releasably holding the same in either of its two positions of movement.

4. For a five speed and reverse gear shift mechanism in which a gear shift lever on a sleeve-like hub is turnable about a fixed axis provided by a shaft extending from a transmission housing and slidable between two extreme positions therealong, a blockout device comprising a base secured to said transmission housing, a stop member pivotally mounted on said base adjacent said shaft for swinging movement toward and from the same, said stop member having a surface disposed midway the extreme positions assumed by said hub along said shaft for limiting said hub for sliding movement between only one of said extreme positions and an intermediate position along the axis of said shaft.

5. For a five speed and reverse gear shift mechanism in which a gear shift lever on a sleeve-like hub is turnable about a fixed axis provided by a shaft extending vertically from a transmission housing and slidable along said shaft between two extreme positions therealong to either side of an intermediate position, a blockout device comprising a base secured to said transmission housing, a stop member pivotally mounted on said base adjacent said shaft for swinging movement toward and from the same, said stop member having a curved contour on its free end adapted to lie against said shaft and a supporting surface disposed midway between the extreme positions assumed by said hub for supporting the latter intermediate the extreme ends of said shaft, and means on said base and said stop member for releasably holding the latter in a position to engage said hub.

References Cited in the file of this patent
UNITED STATES PATENTS

| | | |
|---|---|---|
| 447,607 | Gleason | Apr. 3, 1891 |
| 1,203,048 | Rastetter | Oct. 31, 1916 |
| 1,619,955 | Reinhard | Mar. 8, 1927 |
| 2,591,602 | Pilcher | Apr. 1, 1952 |